(12) United States Patent
Totsuka

(10) Patent No.: US 8,411,185 B2
(45) Date of Patent: Apr. 2, 2013

(54) SOLID-STATE IMAGING APPARATUS HAVING PLURAL UNIT CELL GROUPS WITH TRANSFER SWITCHES CONNECTED TO DIFFERENT COMMON OUTPUT LINES

(75) Inventor: Hirofumi Totsuka, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 12/697,430

(22) Filed: Feb. 1, 2010

(65) Prior Publication Data
US 2010/0214461 A1 Aug. 26, 2010

(30) Foreign Application Priority Data

Feb. 23, 2009 (JP) ................................. 2009-039401

(51) Int. Cl.
*H04N 5/335* (2011.01)
*H04N 5/225* (2006.01)
(52) U.S. Cl. ...... 348/308; 348/294; 348/340; 250/208.1
(58) Field of Classification Search .................. 348/294, 348/308, 340, E05.091, E05.024
See application file for complete search history.

(56) References Cited

U.S. PATENT DOCUMENTS

| 7,633,540 | B2 | 12/2009 | Totsuka | 348/294 |
|---|---|---|---|---|
| 7,852,393 | B2 * | 12/2010 | Kikuchi et al. | 348/308 |
| 7,948,541 | B2 * | 5/2011 | Koizumi et al. | 348/300 |
| 2003/0141436 | A1 * | 7/2003 | Koizumi et al. | 250/208.1 |
| 2006/0169871 | A1 | 8/2006 | Kochi | 250/208.1 |
| 2008/0049130 | A1 | 2/2008 | Koizumi et al. | 348/298 |
| 2008/0180547 | A1 * | 7/2008 | Hirose | 348/229.1 |
| 2008/0309809 | A1 * | 12/2008 | Cieslinski | 348/308 |
| 2009/0034032 | A1 * | 2/2009 | Totsuka | 358/513 |
| 2009/0115876 | A1 * | 5/2009 | Totsuka | 348/294 |
| 2009/0141157 | A1 * | 6/2009 | Kobayashi et al. | 348/308 |
| 2009/0322922 | A1 | 12/2009 | Saito et al. | 348/308 |
| 2010/0006743 | A1 | 1/2010 | Kato et al. | 250/208.1 |
| 2010/0079648 | A1 | 4/2010 | Totsuka et al. | 348/308 |

FOREIGN PATENT DOCUMENTS

| JP | 6-204445 A | 7/1994 |
|---|---|---|
| JP | 2003-224776 A | 8/2003 |
| JP | 2006-211363 A | 8/2006 |
| JP | 2008-054246 A | 3/2008 |

* cited by examiner

*Primary Examiner* — Hung Lam
(74) *Attorney, Agent, or Firm* — Fitzpatrick, Cella, Harper & Scinto

(57) ABSTRACT

A solid-state imaging apparatus includes a plurality of unit cell groups arranged in a row direction and a plurality of common output lines for transmitting output signals from the plurality of unit cell groups, each including a plurality of unit cells arranged in the row direction. Each of the plurality of unit cells includes an m number of pixels arranged in a column direction and including photoelectric conversion elements each converting incident light to different color signals; an m number of holding units holding color signals of the m number of pixels; an m number of color selecting switches each selecting one color signal from within the color signals held in the m number of holding units; and a transfer switch outputting the color signals selected by the color selecting switches to one common output line of the plurality of common output lines.

9 Claims, 17 Drawing Sheets

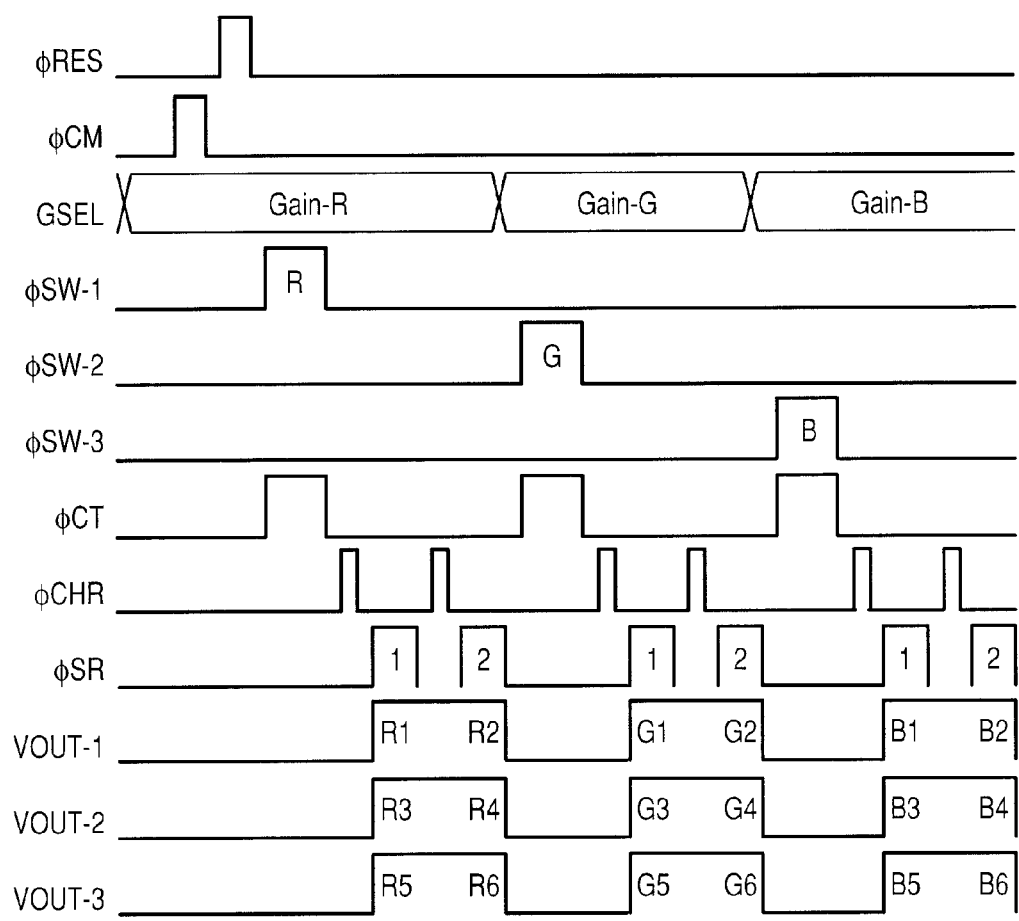

SOLID-STATE IMAGING APPARATUS HAVING PLURAL UNIT CELL GROUPS WITH TRANSFER SWITCHES CONNECTED TO DIFFERENT COMMON OUTPUT LINES

BACKGROUND OF THE INVENTION

1. Field of the Invention

The present invention relates to a solid-state imaging apparatus which can be used in an image reader apparatus such as a copying machine and a scanner.

2. Description of the Related Art

As the solid-state imaging apparatus for use in the image reader apparatus such as a copying machine and a scanner, for example, Japanese Patent Application Laid-Open No. 2006-211363 (hereinafter referred to as Patent Document 1) discloses a solid-state imaging apparatus including photodiodes each reading a plurality of color components and having a holding capacitor corresponding to each photodiode as illustrated in FIG. 1.

Japanese Patent Application Laid-Open No. H06-204445 (hereinafter referred to as Patent Document 2) discloses a solid-state imaging apparatus which illustrates one common output line, but illustrates another solid-state imaging apparatus configured to output a signal for each color component as illustrated in FIG. 12 of Patent Document 2. The solid-state imaging apparatus of Patent Document 2 outputs signals in parallel from a plurality of common output lines, and thus the read time thereof can be faster than that of the Patent Document 1 by the number of parallel lines.

When each of the above solid-state imaging apparatuses reads signals from the holding capacitors, for example, as disclosed in Japanese Patent Application Laid-Open No. 2003-224776 (hereinafter referred to as Patent Document 3), the signals are read through a transfer switch according to the gain corresponding to a capacitively dividing ratio between the total capacitance of the common output lines and the holding capacitance. Assuming that the total capacitance value of the common output lines is CH, and the holding capacitance value is CT, the read gain Gc is expressed as $Gc=CT/(CT+CH)$. Thus, the value of Gc is always less than 1. In order to compensate for lost gain, a gain of 1 or more is multiplied by an output circuit at a following stage thereof before output.

In addition to the above configurations, Japanese Patent Application Laid-Open No. 2008-054246 (hereinafter referred to as Patent Document 4) discloses still another configuration to meet the needs to further improve the S/N ratio. In this configuration, an amplifier circuit is disposed in a vertical transfer unit operating at low speeds and signal amplification is performed by narrowing the band to lower noise.

In recent years, there has been a need to improve productivity of the image reader apparatus such as a copying machine. This trend has accelerated demand for a higher speed solid-state imaging apparatus. One of the factors determining the operation speed of the solid-state imaging apparatus is a charge/discharge time to and from the above described common output line. In other words, the reduction in common output line capacitance is effective to achieve a higher speed. Patent Document 3 discloses a blocking technique for reducing the common output line capacitance by grouping a plurality of pixels in different columns into blocks to reduce the number of transistors connected to the common output lines. Unfortunately, Patent Document 3 considers only the general case where the solid-state imaging apparatus reads one pixel per column, but does not consider the configuration where the solid-state imaging apparatus reads a plurality of color pixels per column at the same time.

SUMMARY OF THE INVENTION

In view of the above problems, the present invention has been made, and an object of the present invention is to achieve reduction, in common output line, capacitance for the solid-state imaging apparatus which reads a plurality of color pixels per column at the same time.

According to an aspect of the present invention, a solid-state imaging apparatus comprises, a plurality of unit cell groups arranged along a row direction, each unit cell group including a plurality of unit cells arranged along the row direction and common output lines, of which number is multiples of integer m, for transferring output signals from the plurality of unit cell groups, wherein each of the unit cells includes m pixels arranged in a column direction, and including photoelectric conversion elements corresponding to respectively different colors a holding unit for holding a signal from the m pixels a selecting switch for selecting the signal held by the holding unit and a transfer switch for outputting the signal selected by the selecting switch to the common output line, and wherein the transfer switch is connected on unit cell by one unit cell to different one of the common output lines, and the signals are read out in parallel from plural ones among the common output lines of which number is multiples of integer m.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 21 is a timing chart of a fifth embodiment.

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

Hereinafter, an example of applying the present invention to a color copying machine will be described, but the present invention can be applied to a digital camera and the like.

FIRST REFERENCE EXAMPLE

Figure 9:
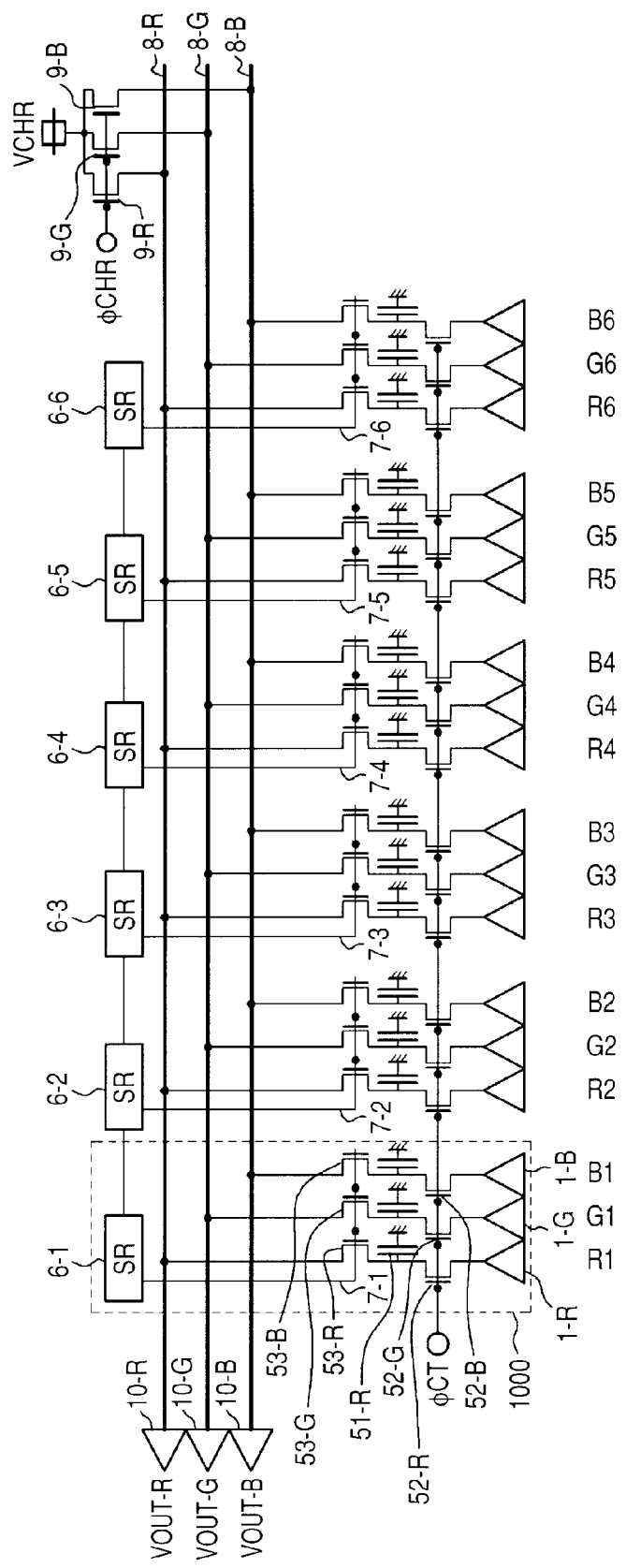
FIG. 9 illustrates a configuration example of a solid-state imaging apparatus as a first reference example.

FIG. 9 schematically illustrates a configuration example of the solid-state imaging apparatus for use in a color copying machine as a first reference example. More specifically, the example illustrates a color line sensor with 6 bits×3 colors which includes a pixel 1 which reads color components of red (R), green (G) and blue (B) each assumed to be R pixel 1-R, G pixel 1-G, B pixel 1-B, a holding capacitor 51, a write switch 52 which controls writing in response to signal φCT, and a transfer switch 53.

Scanning circuits 6 sequentially scan the signals from the holding capacitors 51. Scanning signals 7 φSR are used to control the transfer switches 53 from the scanning circuits 6 by scanning the holding capacitors 51. Common output lines 8 are used to output the signals from the holding capacitors 51 in response to the scanning signals 7. Reset units 9 reset the respective common output lines 8 to voltage VCHR in response to gate signal φCHR. Output circuits 10 amplify and output the signals from the respective common output lines. The common output lines 8 each output respective color components 8-R, 8-G, and 8-B. The reset units 9-R, G, and B, and the output circuits 10-R, G, and B are provided to the respective common output lines 8-R, G, and B. The numbers R1 to R6, G1 to G6, and B1 to B6 assigned to each pixel 1 indicate the number of bits of the pixel. Unit cells 1000 are arranged side-by-side in units of columns such as pixels 1-R, 1-G, and 1-B, but actually the unit cells are generally arranged in tandem. In the following description, transistors used as switches or switching purposes are assumed to be electrically conducting at high level and electrically non-conducting at low level.

Figure 2:
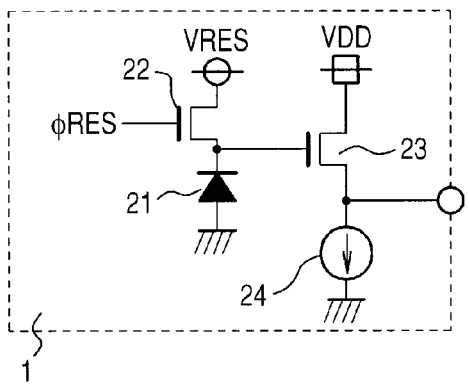
FIG. 2 illustrates a configuration example of a pixel.

A configuration example of the pixel 1 is illustrated in FIG. 2. The pixel 1 includes a photoelectric conversion element 21, a reset transistor 22 which resets the photoelectric conversion element 21 to the voltage VRES in response to the gate signal φRES, a source follower input transistor 23 which receives a signal from the photoelectric conversion element 21, and a source follower constant current circuit 24. The constant current circuit 24 can be implemented, for example, by an MOS transistor whose gate electrode is fixed to a constant voltage, whose drain electrode is connected to the source electrode of the source follower input transistor 23 and whose source electrode is connected to the power source. Moreover, the constant current circuit 24 may include an amplifier circuit disclosed in Patent Document 4.

Figure 10:
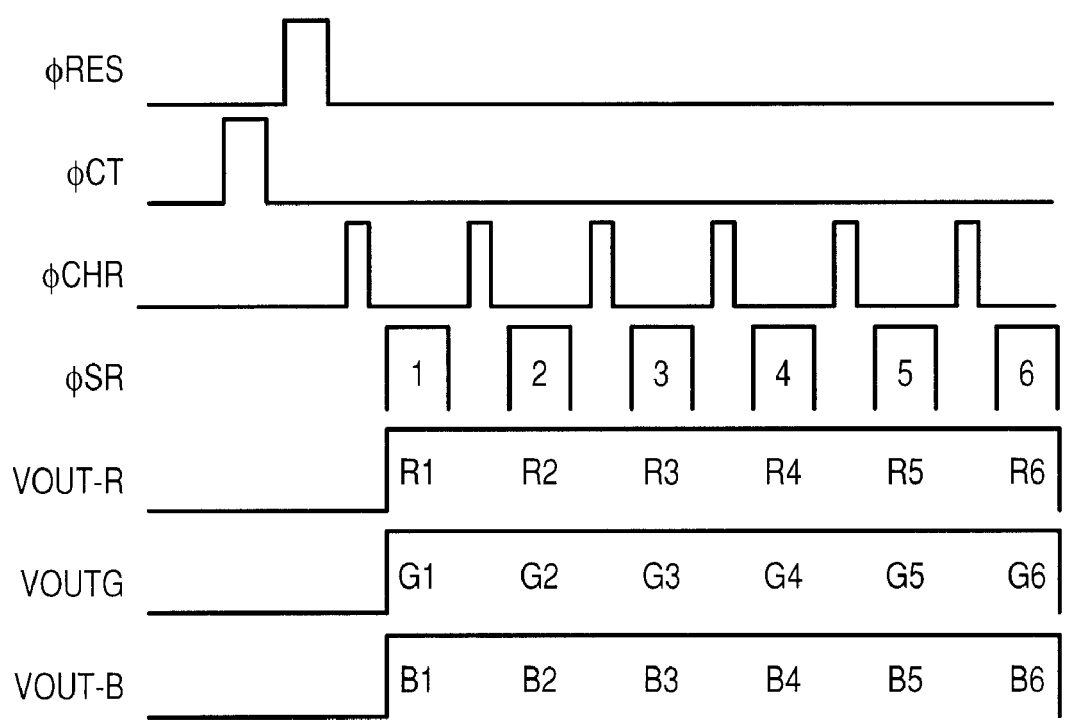
FIG. 10 is a timing chart of the first reference example.

Now, the operation of the first reference example will be described based on the timing chart of FIG. 10. First, there is an accumulation period (not illustrated) in which incident light is accumulated in the photoelectric conversion element 21. During the accumulation period, a signal converted to an electrical signal by the photoelectric conversion element 21 is output from the source electrode of the source follower input transistor 23. When the signal φCT goes high, the write switch 52 is turned on and the signal written into the holding capacitor 51. Then, in a timing illustrated in the timing chart, when φCHR and φSR (scanning signal 7) go high, the signal is output to the output circuit 10 with a gain Gc based on the capacitance value CT of the holding capacitor 51 and the capacitance value CH of the common output line 8 as described above. The signal is output through the output circuit 10 in the order of VOUT-R, G, and B.

Here, the total capacitance value CH of the common output lines 8 is roughly determined by the total sum of the parasitic capacitance (mainly, the capacitance in relation to ground and the capacitance between adjacent wirings) of the wirings of the common output lines 8 themselves, the parasitic capacitance of the reset transistors 9 and the transfer switches 53 for the number of bits, and the input capacitance of the output circuits 10. Note that the first reference example uses 6 transfer switches 53. That is, in the configuration of the first reference example, the number of transfer switches 53 connected to the common output lines 8 is the same as the number of bits.

SECOND REFERENCE EXAMPLE

Figure 11:
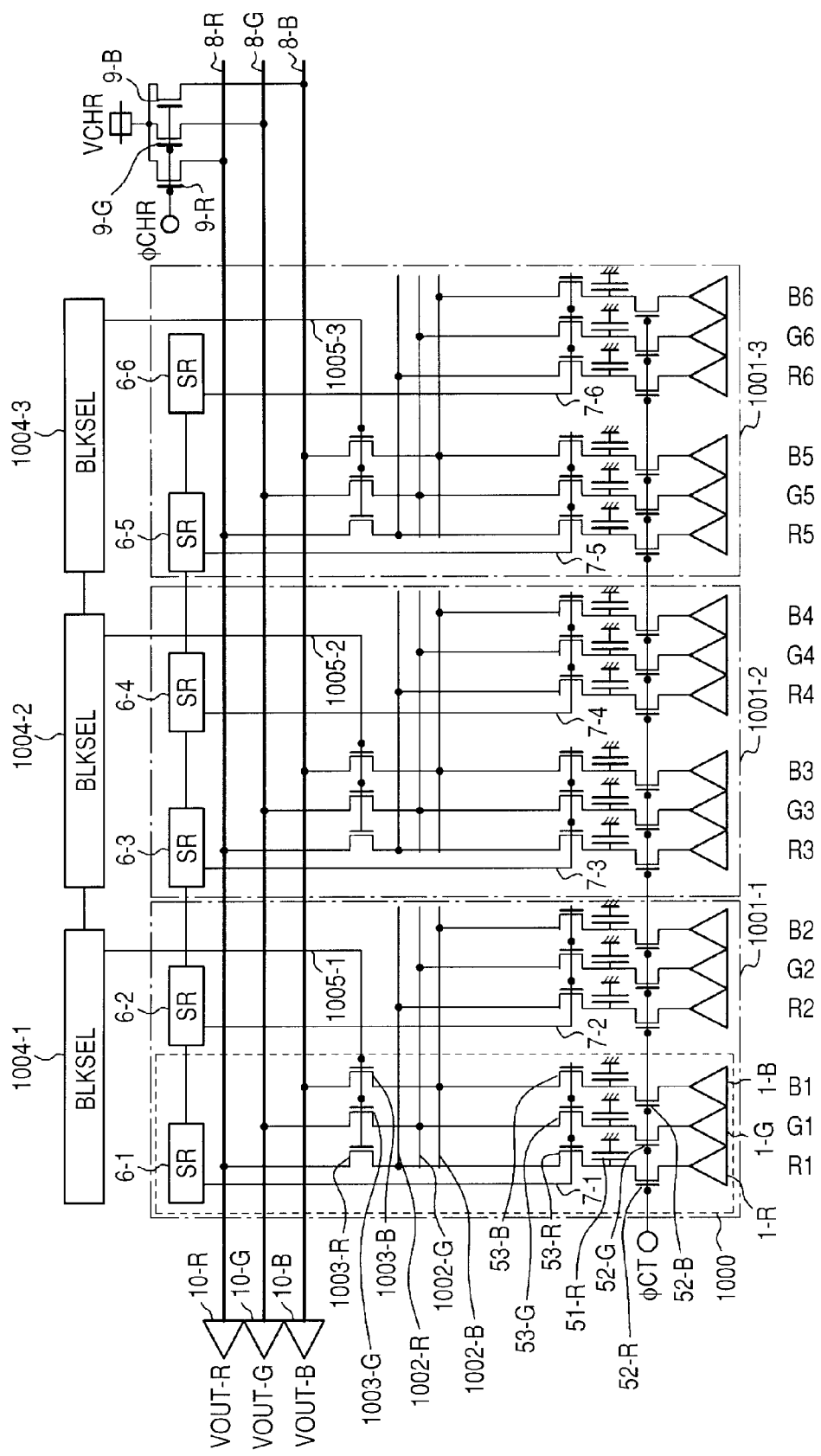
FIG. 11 illustrates a configuration example of a solid-state imaging apparatus as the second reference example.

Next, FIG. 11 illustrates a configuration example of the second reference example where the common output line blocking technique disclosed in the third reference example is applied to the configuration illustrated in the first reference example. Note that the same reference numerals or characters are assigned to the same components as those in FIG. 9 described above, and the description thereof is omitted. In the second reference example, all pixels are divided into a plurality of block regions. Here six bits are divided into three 2-bit blocks. The second reference example includes block regions 1001, block output lines 1002 each in a block region 1001, block selecting switches 1003 each connecting between a block output line and a common output line 8, block selection units 1004 each selecting a block region, and block selecting signals 1005.

Figure 12:
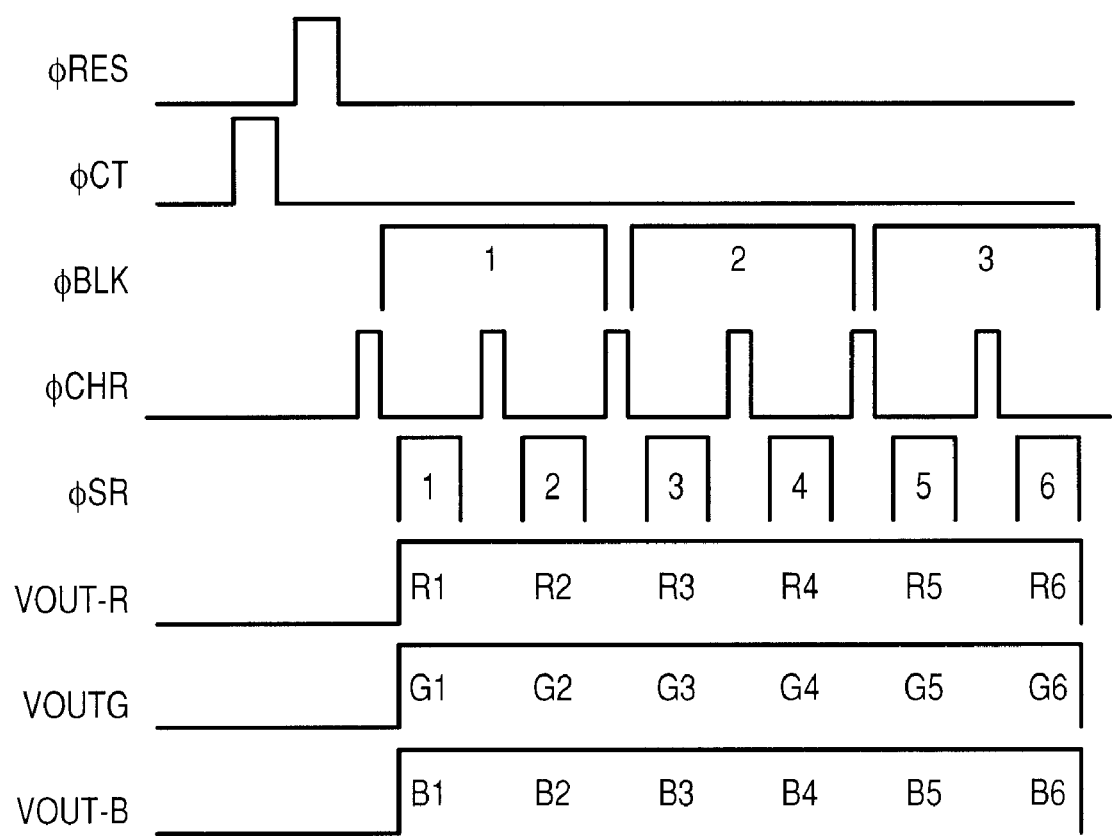
FIG. 12 is a timing chart of the second reference example.

FIG. 12 is timing chart of the second reference example. Note that the same reference numerals or characters are assigned to the same components as those in FIG. 10 described above, and the description thereof is omitted. Each block is selected when the block selecting switch 1003 of the φBLK (block selecting signal 1005) is switched at a frequency (½ in the second reference example) lower than that of the scanning signal 7 (φSR) as illustrated in the figure, and the signal is output as illustrated in the figure.

As illustrated in the figure, the first block selecting signal 1005-1 goes high when the scanning signals 7-1 and 2 (φSR) corresponding to the first and second bits go high. The second block selecting signal 1005-2 goes high when the scanning signals 7-3 and 4 (φSR) go high. The third block selecting signal 1005-3 goes high when the scanning signals 7-5 and 6 (φSR) go high. The block selection unit 1004 controls such that the block selecting signals 1005-1, 2 and 3 go high at a leading edge of the respective scanning signals 7-1, 3, and 5 (φSR), and the block selecting signals 1005-1, 2 and 3 go low at a falling edge of the respective scanning signals 7-2, 4 and 6 (φSR).

Here, in comparison with the first reference example, the total capacitance value CH of the common output lines 8 in the second reference example can be reduced such that the number of transfer switches 53 is reduced to 2, and the number of block selecting switches 1003 is reduced to 1, which means reduction in the common output line capacitance by that amount. Moreover, the increase in gain Gc can increase the sensitivity of the entire solid-state imaging apparatus. Note that when the common output lines 8 are grouped into blocks using the blocking technique disclosed in the second reference example, the optimal number of blocks is determined depending on the length and thickness of the common output line 8, the number of pixels, the parasitic capacitance of the transistors, and the like.

THIRD REFERENCE EXAMPLE

Figure 1:
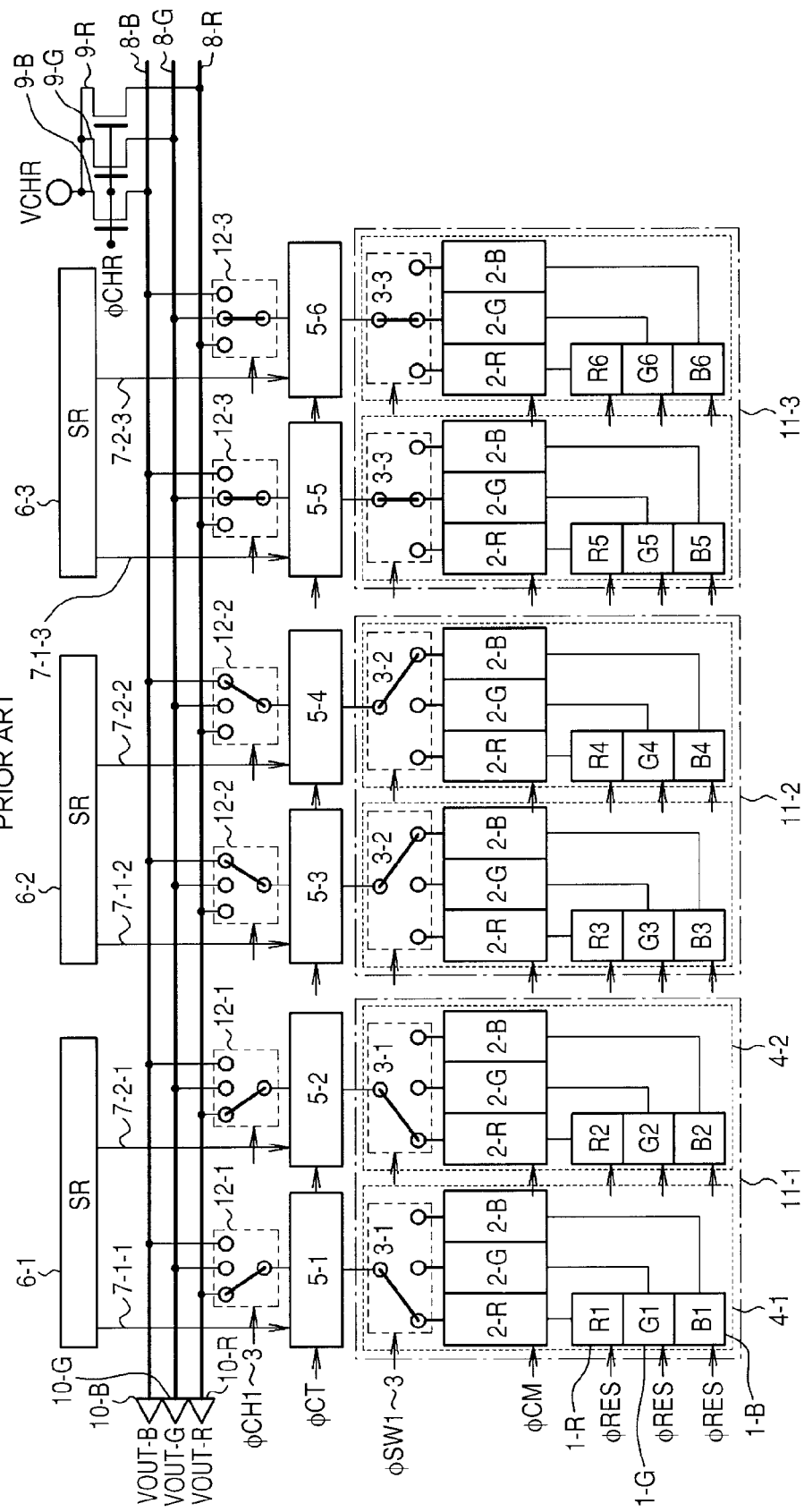
FIG. 1 illustrates a configuration example of a solid-state imaging apparatus as the third reference example.

Next, a configuration example of the third reference example is illustrated in FIG. 1. In the figure, a unit cell 4 includes a plurality of pixels 1, intermediate holding units 2 the number of which is the same as that of the pixels 1 and each of which holds a signal from each pixel 1, and a selection unit 3 which selects and outputs any one of the connected intermediate holding units 2. Each of the pixels 1 in each unit cell 4 reads a different color component. In the third reference example, the pixels 1 each read the respective color components R, G, and B, each assuming R pixel 1-R, G pixel 1-G, and B pixel 1-B. Each unit cell 4 is configured such that one color corresponds to one pixel. Each pixel 1 is connected to the respective intermediate holding units 2-R, 2-G, and 2-B.

Holding units 5 each hold an output signal from each unit cell 4. All unit cells 4 are divided into unit cell groups 11. Switching units 12 each are connected to one of the holding units 5, and select any one of the common output lines 8-R, G, and B to connect the common output line and the holding unit 5 in response to the control signals φCH-1, 2, and 3. The scanning circuits 6 are divided into the scanning circuits 6-1 to 3 each corresponding to the respective unit cell groups 11-1 to 3. Each of the scanning circuits 6-1 to 3 simultaneously scans the respective holding units 5 of the respective unit cell groups 11-1 to 3 in response to the scanning signal 7. The common output lines 8 each output a color component, and are assumed to be 8-R, 8-G, and 8-B.

Figure 3:
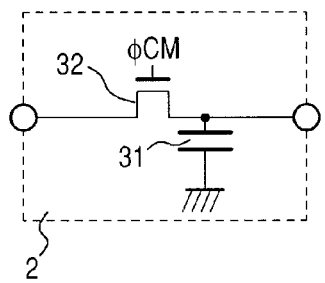
FIG. 3 illustrates a configuration example of an intermediate holding unit.

Like the first reference example, a configuration example of the pixel 1 is illustrated in FIG. 2. A configuration example of the intermediate holding unit 2 is illustrated in FIG. 3. In the figure, the intermediate holding unit 2 includes an intermediate holding capacitor 31 and a write switch 32 which writes in response to the gate signal φCM.

Figure 4:
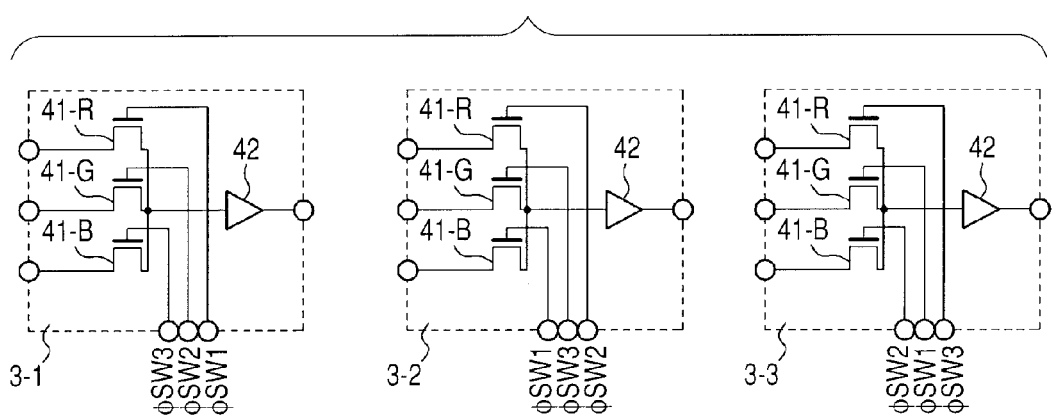
FIG. 4 illustrates a configuration example of a selection unit.

FIG. 4 each illustrates a configuration example of the selection units such as the selection units 3-1 in the first unit cell group 11-1, the selection units 3-2 in the second unit cell group 11-2, and the selection units 3-3 in the third unit cell group 11-3 each provided in the unit cell 4. In the third reference example of the figure, the selection unit 3 includes three selection transistors 41-R, G, and B each of which outputs any one of the three pixels R, G, and B from the respective intermediate holding capacitors 31. Examples of the amplifier unit 42 include a source follower circuit and an amplifier circuit disclosed in Patent Document 4. The drain electrode of each selection transistor 41 is connected to a different intermediate holding unit 2, and the source electrode thereof is short-circuited to be output from the unit cell through the amplifier unit 42. The gate of each selection transistor 41 is connected to a different one of control signal lines φSW1 to 3. In response to one of the control signals φSW1 to 3, the signal of any one of the intermediate holding capacitors 31 is selected. Note that in FIG. 4, the amplifier unit 42 is provided at the following stage of the selection transistor 41, but may be provided at the preceding stage thereof. Note also that each of the selection units 3-1, 2, and 3 is assumed to have a connection relation with the control signals φSW1 to 3 as illustrated in the figure. Thus, in each unit cell group 11, each selection unit 3 can select an intermediate holding unit 2 each having a different color component.

Figure 5:
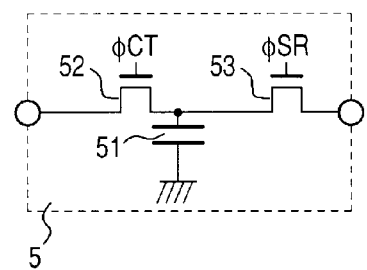
FIG. 5 illustrates a configuration example of the holding unit.

A configuration example of the holding unit 5 is illustrated in FIG. 5. The holding unit 5 includes a holding capacitor 51, a write switch 52 which writes in response to φCT, and a transfer switch 53 which transfers the signal from the holding capacitor 51 to the common output line 8 in response to the scanning signal 7(φSR) from the scanning circuit 6.

Figure 6:
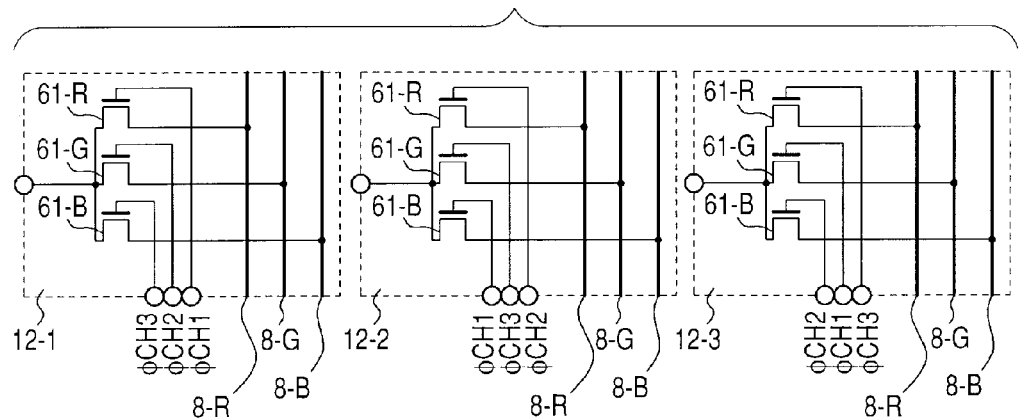
FIG. 6 illustrates a configuration example and a connection example of a switching unit.

The switching units 12-1, 2, and 3 are each provided to correspond to the respective unit cell groups 11-1, 2, and 3, and the control signal lines φCH1, 2, and 3 are connected as illustrated in FIG. 6. In FIG. 6, the switching transistor 61 switches the connection between each holding unit 5 and the corresponding common output line 8. Thus, a common output line 8 corresponding to a different color component can be selected for each unit cell group 11 each connected through the corresponding holding unit 5.

Figure 7:
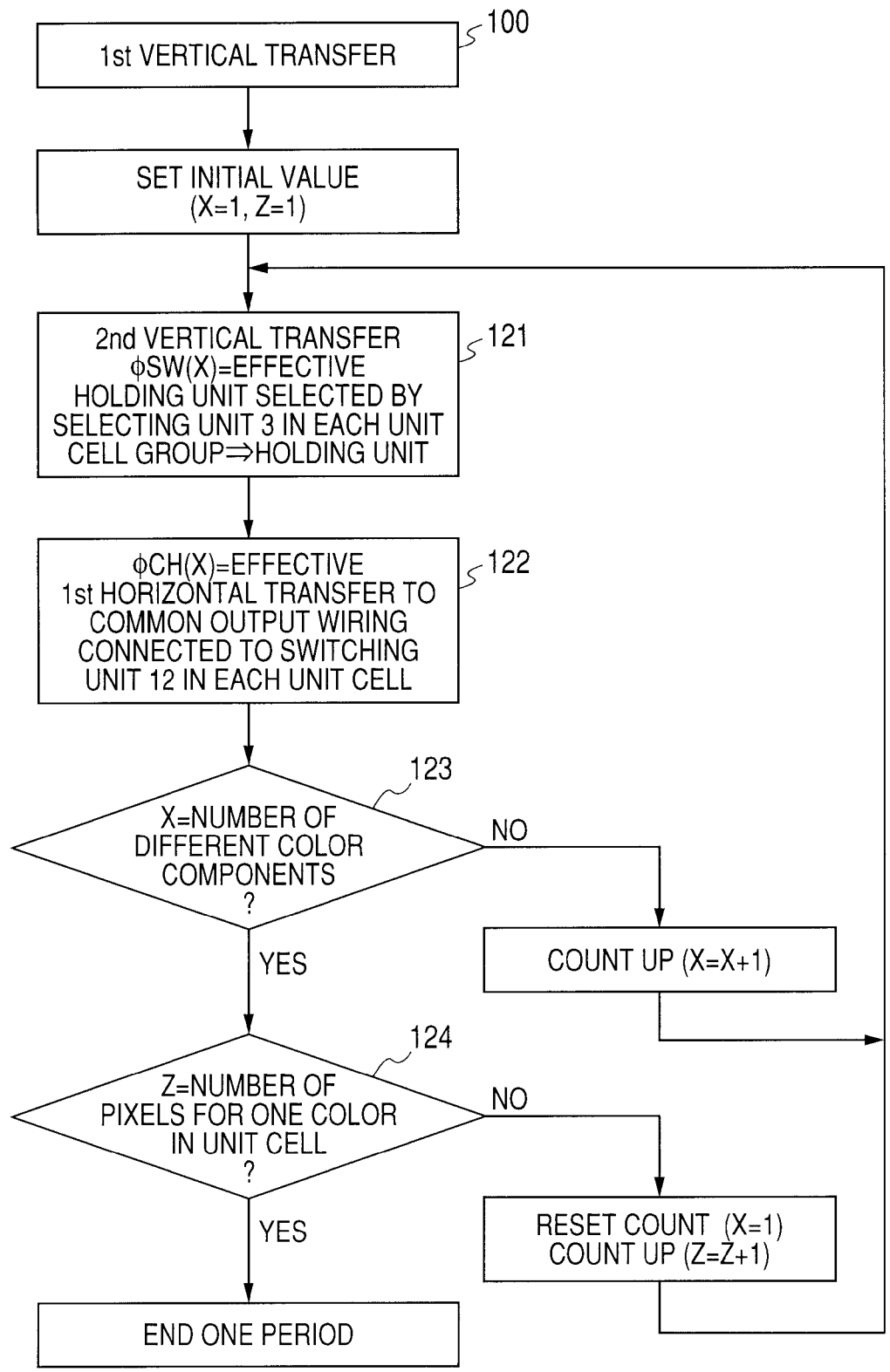
FIG. 7 is a flowchart of the third reference example.
Figure 8:
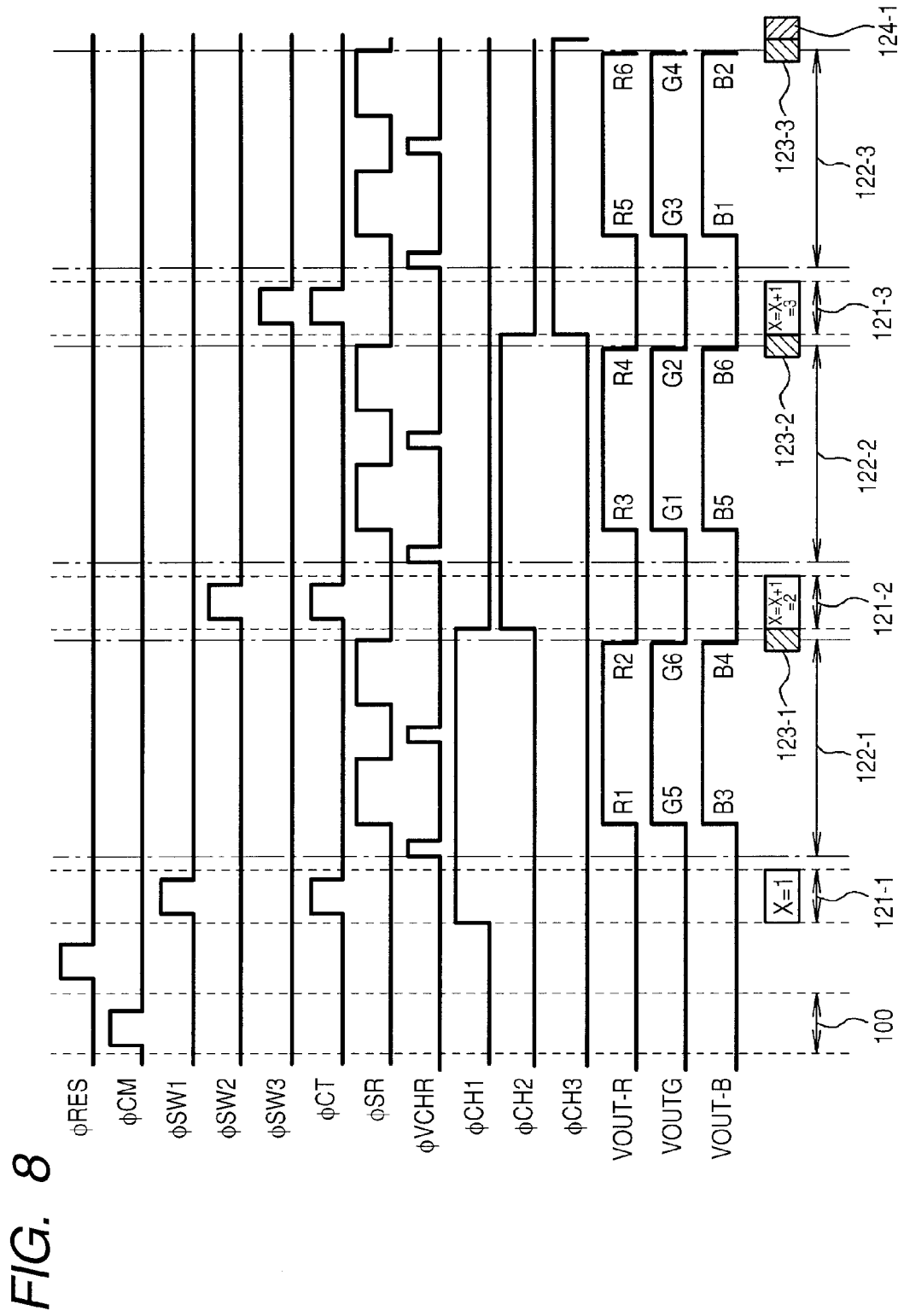
FIG. 8 is a timing chart of the third reference example.

Next, the operation will be described based on the flowchart of FIG. 7 and the timing chart of FIG. 8. A first vertical transfer 100 is to transfer all the signals of all the pixels 1 to the intermediate holding units 2. A second vertical transfer 121 is to transfer the signal held in any one of the intermediate holding capacitors 2 selected by the selection unit 3, to the holding unit 5. A horizontal transfer 122 is to transfer the signal held in the holding unit 5 of each unit cell group 11 in parallel to any one of the common output lines 8 according to the scanning of the scanning circuit 6 and the switching of the switching unit 12. A first determination 123 is to determine whether the value of variable X is equal to (YES) the number of different color components (3 in the third reference example) or not (NO), assuming that the variable X changes following the flowchart of FIG. 7 so as to determine the next operation. A second determination 124 is to determine whether the value of variable Z is equal to (YES) the number of pixels per color component in a unit cell 4 (1 in the third reference example) or not (NO), assuming that the variable Z changes following the flowchart of FIG. 7 so as to determine the next operation. The first determination 123 can be implemented by a first counter which counts the number of times the second vertical transfer 121 is performed, as the variable X. The second determination can be implemented by a second counter which counts the number of times the first determination 123 determines YES, as the variable Z.

During the second vertical transfer 121, when the control signal φSW(X) goes high, the signal of the intermediate holding unit 2 selected by the selection unit 3 is written to the holding unit 5 in each unit cell group 11. During the first horizontal transfer 122, when the control signal φCH(X) goes high, each holding unit 5 is connected to each common output line 8 through the switching unit 12 to sequentially output the signal according to the scanning of the scanning circuit 6.

First, there is an accumulation period (not illustrated) in which incident light is accumulated in the photoelectric conversion element 21. During the accumulation period, a signal converted to an electrical signal by the photoelectric conversion element 21 is amplified and output from the source electrode of the source follower input transistor 23. In the first vertical transfer 100, when φCM goes high, the signal from each pixel 1 is written to each connected intermediate holding unit 2, and at the falling edge of φCM, the signal value is held.

Next, each initial value of the first and second counters is set to 1 (X=Z=1). During the first transfer of the second vertical transfer 121-1, when φSW1 goes high, the corresponding selection unit 3 selects the corresponding intermediate holding unit 2 and writes a signal of the corresponding color component to the corresponding holding unit 5 in each unit cell group 11 in the relation as listed below.

The first unit cell group 11-1→the intermediate holding unit 2-R for a color component R.

The second unit cell group 11-2→the intermediate holding unit 2-B for a color component B.

The third unit cell group 11-3→the intermediate holding unit 2-G for a color component G.

When φCH1 goes high, each holding unit 5 connected to corresponding unit cell group 11 is connected to the corresponding common output line 8 through the corresponding switching unit 12 in the relation as listed below. The above switching operation needs to be completed at least before the subsequent horizontal transfer.

The holding unit 5 connected to the first unit cell group 11-1→the common output line 8-R for a color component R. The holding unit 5 connected to the second unit cell group 11-2→the common output line 8-B for a color component B. The holding unit 5 connected to the third unit cell group 11-3→the common output line 8-G for a color component G.

When the first transfer of the second vertical transfer 121-1 is completed, as a first horizontal transfer 122, each signal held in the holding unit 5 is sequentially output to the common output line 8 according to each scanning of the scanning circuits 6-1, 2, and 3.

Then, the first determination of the first determination 123-1 is made as "NO" as X=1, and thus the first counter is incremented by 1 (X=X+1=2). Then, the second transfer of the second vertical transfer 121-2 is performed. At this time, since φW2 is high, the selection unit 3 selects as follows.

The first unit cell group 11-1→the intermediate holding unit 2-G for the color component G.

The second unit cell group 11-2→the intermediate holding unit 2-R for the color component R.

The third unit cell group 11-3→the intermediate holding unit 2-B for the color component B.

Then, during the second horizontal transfer 122-2, the signal is read from a common output line 8 in the connection relation as listed below.

The holding unit 5 connected to the first unit cell group 11-1→the common output line 8-G for the color component G. The holding unit 5 connected to the second unit cell group 11-2→the common output line 8-R for the color component R. The holding unit 5 connected to the third unit cell group 11-3→the common output line 8-B for the color component B.

Subsequently, the second determination of the first determination 123-2 is made as "NO", and thus the counter is incremented by 1 (X=X+1=3). Then, the third transfer of the second vertical transfer 121-3 and the third horizontal transfer 122-3 are performed.

Then, the second determination 124-1 is made as "YES" as Z=1, and one period from accumulation to reading is terminated. At this time, all pixel signals are read and output in the order illustrated by VOUT-R, G, and B in FIG. 8. In this manner, only one color component is output from one common output line 8. When attention is paid to all common output lines 8, signals in a different region in a different color are read in parallel at the same time.

The use of the configuration of the third reference example can reduce the number of components and thus can provide a small footprint solid-state imaging apparatus. Note that the total capacitance value CH of the common output lines 8 of the present configuration is equal to that of the first reference example. Although the description is omitted, it is apparent that the use of the blocking technique of the second reference example can provide the same capacitance value as that of the second reference example.

Hereinafter, the solid-state imaging apparatus according to embodiments of the present invention will be described based on the accompanying drawings. It should be noted that the embodiments are not intended to limit the present invention.

(First Embodiment)

Figure 13:
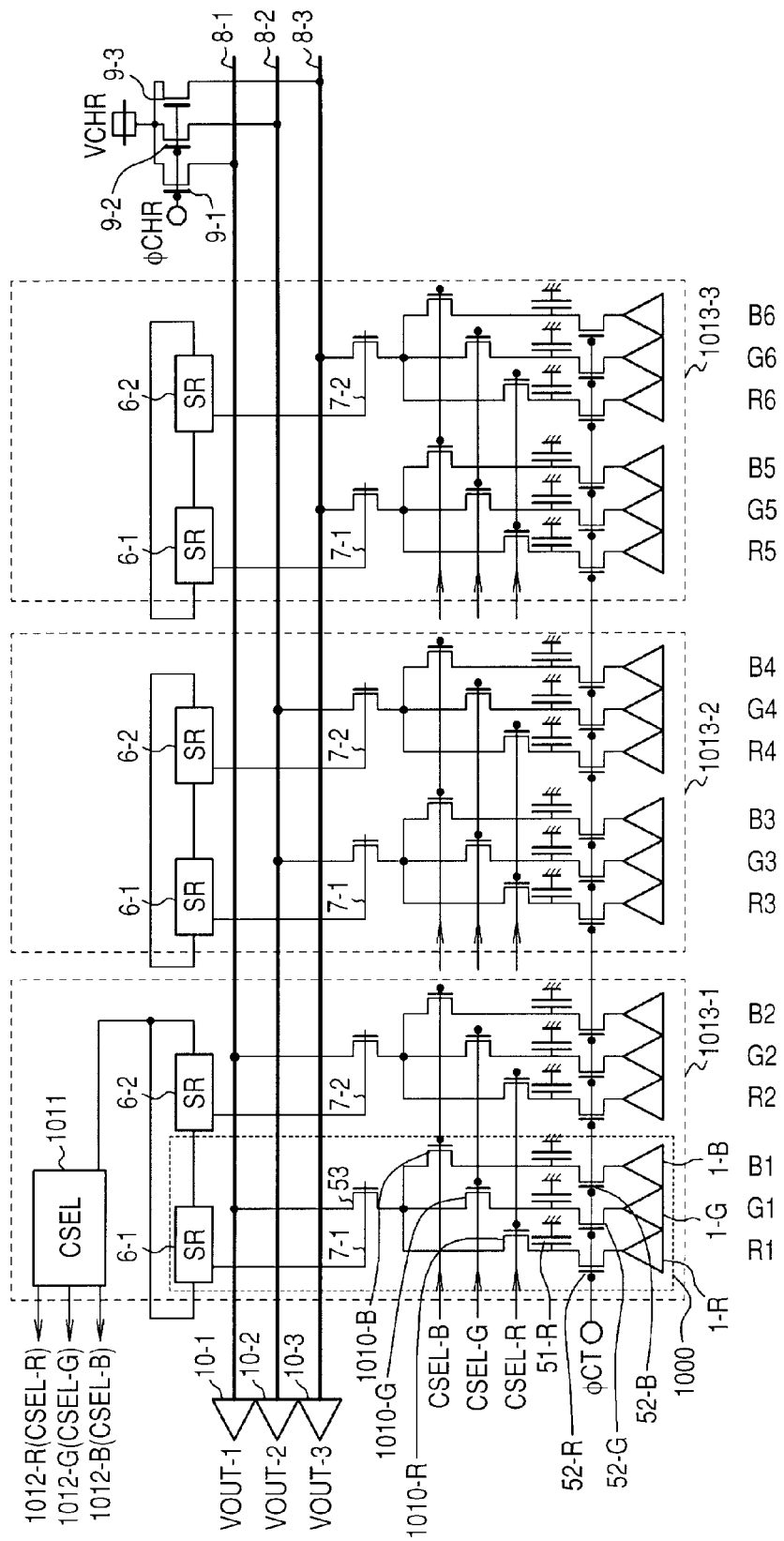
FIG. 13 illustrates a configuration example of a solid-state imaging apparatus of a first embodiment.

FIG. 13 illustrates a configuration example of the solid-state imaging apparatus of a first embodiment of the present invention. Note that the same reference numerals or characters are assigned to the same components as those in FIG. 9 described above, and the description thereof is omitted. The solid-state imaging apparatus of the first embodiment includes color selecting switches 1010 each inserted between a holding capacitor 51 and a transfer switch 53, a color selecting unit 1011, color selecting signals 1012 each selecting one of the colors R, G, and B, and three unit cell groups 1013 formed by dividing all pixels by the same number of colors. Note that here, the color selecting signals 1012-R, G, and B from the color selecting unit 1011 are connected commonly to all columns, but, for example, a color selecting unit may be provided for each unit cell group 1013 to control individually. The pixel 1 may be configured to include an amplifier circuit in the same manner as described in the first reference example. The scanning circuits 6 are divided for each unit cell group 1013 so as to scan in each region. According to the present embodiment, the least significant bit signal of a scanning circuit 6 in a unit cell group 1013 is input to the color selecting unit 1011 to generate the color selecting signal 1012, but for example, the color selecting signal may be generated by a signal output from a counter which counts the least significant bit signal. Each transfer switch 53 is connected to a different common output line 8 for each unit cell group 1013. The transfer switch 53 of the first unit cell group 1013-1 is connected to the common output line 8-1. The transfer switch 53 of the second unit cell group 1013-2 is connected to the common output line 8-2. The transfer switch 53 of the third unit cell group 1013-3 is connected to the common output line 8-3.

Figure 14:
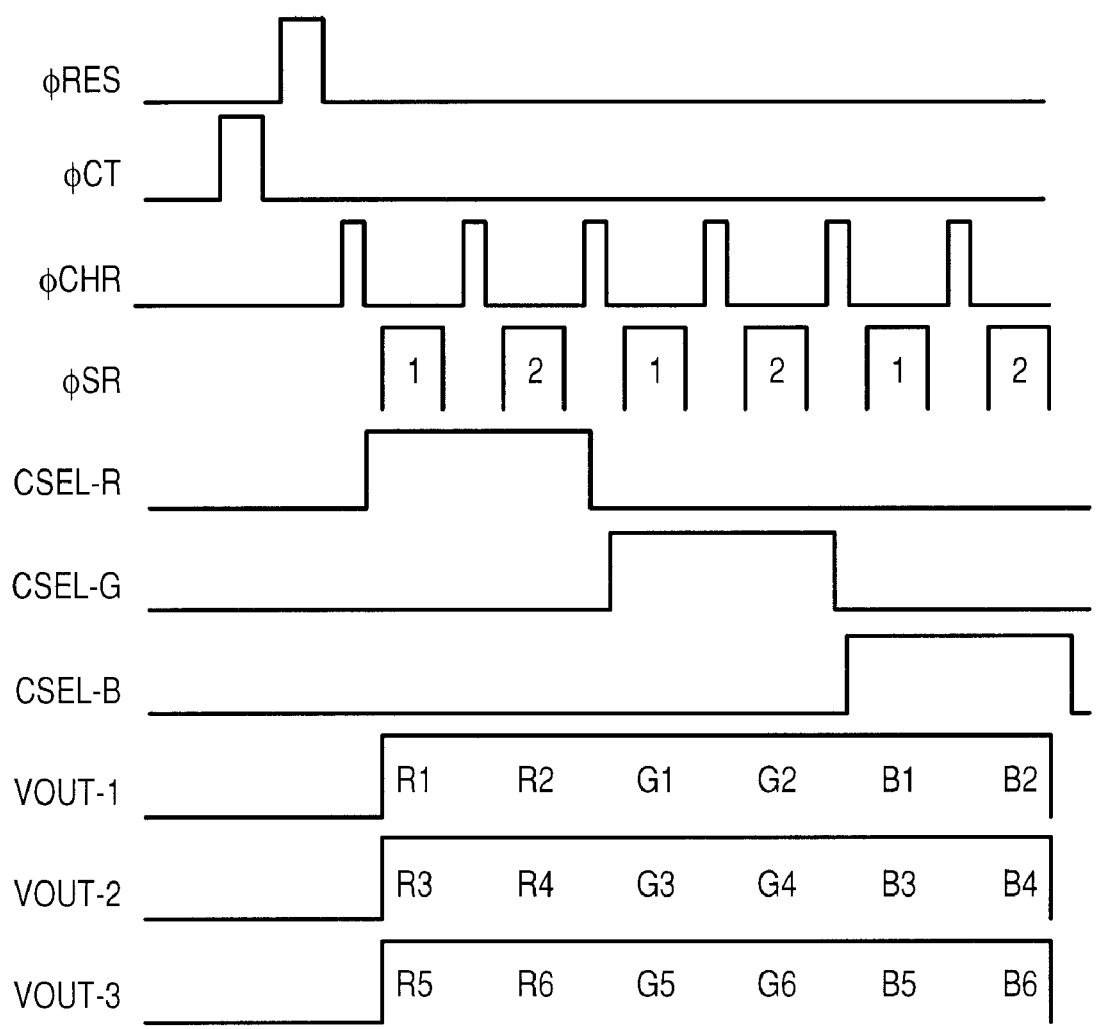
FIG. 14 is a timing chart of the first embodiment.

By referring to the timing chart of FIG. 14, the operation of the present embodiment will be described. Note that the same reference numerals or characters are assigned to the same components as those in FIGS. 10 and 12 described above, and the description thereof is omitted. As illustrated in FIG. 14, according to the color selecting signal 1012, CSEL-R for selecting red goes high at the first cycle of the first and second bit period of the scanning signal 7(φSR), CSEL-G goes high at the second cycle thereof, and CSEL-B goes high at the third cycle thereof. At this time, the color signals are output in the order illustrated in the figure and it is understood that the same color signals are output from each output at the same time. According to the present embodiment, the same color signals are output at the same time, but configuration may be made such that a color selecting unit 1011 is provided for each unit cell group 1013 and each color selecting signal 1012 is used to select a different color at the same time. The following embodiments focus only on a case where the same color signals are output at the same time, but it is possible to output different colors by changing the color selection in the same manner.

In comparison with the first reference example, the total capacitance value CH of the common output lines 8 according to the present embodiment can be reduced such that the number of transfer switches 53 is reduced to 2, and the number of color selecting switches 1010 is reduced to 3, which means reduction in the common output line capacitance by that amount. Moreover, the increase in gain Gc can increase the total sensitivity of the solid-state imaging apparatus. When considered as a 6-bit solid-state imaging apparatus, the effect seems to be small, but the effect can be expressed as the following difference assuming that the number of bits is N and the number of colors is 3. Thus, it is understood that the effect increases for a multi-pixel solid-state imaging apparatus.

(First reference example) the number of switches: an n number of transfer switches.

(First embodiment) the number of switches: (N/3 transfer switches)+(3 color selecting switches) (difference 1)N−N/3−3=2N/3−3.

According to the present embodiment, all color selecting switches 1010 in one column are connected to a transfer switch 53, but the color selecting switches 1010 in a plurality of columns such as two columns may be connected to a transfer switch 53. Alternatively, for example, if an even number of pixels is provided in a column (e.g., R, G, B, and monochrome), an appropriate number of color selecting switches 1010 in a column may be connected to a transfer switch 53. Note that when the above configurations are used, the operation of the scanning signals and the selection signals need to be changed as needed.

Moreover, in comparison with the configuration of the first reference example, particularly for a high-speed solid-state imaging apparatus, it is understood that the number of transfer switches 53 connected per the highest-speed scanning signal 7 can be reduced, the load of the scanning circuits 6 can be reduced, and thus, the configuration is effective for high-speed operation.

As described above, the first embodiment of the present invention provides the solid-state imaging apparatus which outputs for each plurality of color components. According to the present embodiment, the color selecting switches 1010 in one or a plurality of columns are connected to a transfer switch 53, the transfer switch is connected to a different common output line 8 for each divided unit cell group 1013, a scanning circuit 6 is provided for each unit cell group 1013, and each scanning circuit 6 is scanned the same number of times as the number of colors. Thus, the solid-state imaging apparatus according to the present embodiment can reduce the common output line capacitance more than the conventional solid-state imaging apparatus. Further, the solid-state imaging apparatus according to the present embodiment can reduce the load of the scanning circuits 6, and thus more effective for high-speed operation than the conventional solid-state imaging apparatus.

(Second Embodiment)

Figure 15:
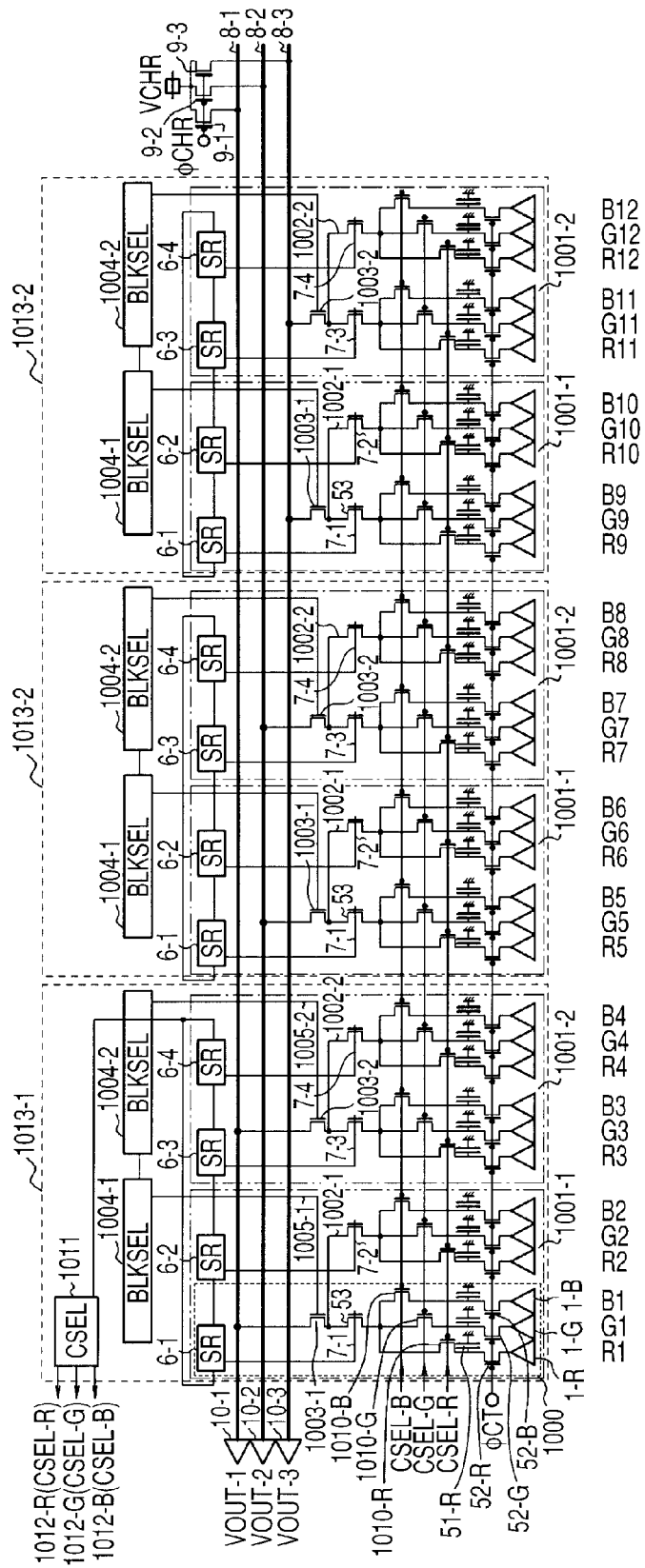
FIG. 15 illustrates a configuration example of a solid-state imaging apparatus of a second embodiment.

FIG. 15 illustrates a configuration example of a solid-state imaging apparatus of a second embodiment of the present invention. Note that the same reference numerals or characters are assigned to the same components as those in FIGS. 11 and 13 described above, and the description thereof is omitted. According to the present embodiment, the blocking technique disclosed in the second reference example is applied to the configuration of the first embodiment to provide a 12 bit×3 color solid-state imaging apparatus to be described below. The pixels are divided into three unit cell groups 1013 for each four columns. In each unit cell group 1013, the pixels are divided into two block regions 1001 for each two columns. In each block region 1001, a transfer switch 53 is connected to a block output line 1002. The block output line 1002 is connected to a common output line 8 through a block selecting switch 1003. In each column, the color selecting switches 1010 are connected to a transfer switch 53. Each block selecting switch 1003 is connected to a different common output line 8 depending on the unit cell group 1013. More specifically, in the first unit cell group 1013-1, the block selecting switch 1003 is connected to the common output line 8-1, in the second unit cell group 1013-2, the block selecting switch 1003 is connected to the common output line 8-2, and in the third unit cell group 1013-3, the block selecting switch 1003 is connected to the common output line 8-3 respectively. The scanning circuits 6 are divided for each unit cell group 1013 in the same manner as in the configuration of FIG. 13. Note that the color selecting unit 1011 may be provided for each unit cell group 1013, for each block region 1001, or in any units.

Figure 16:
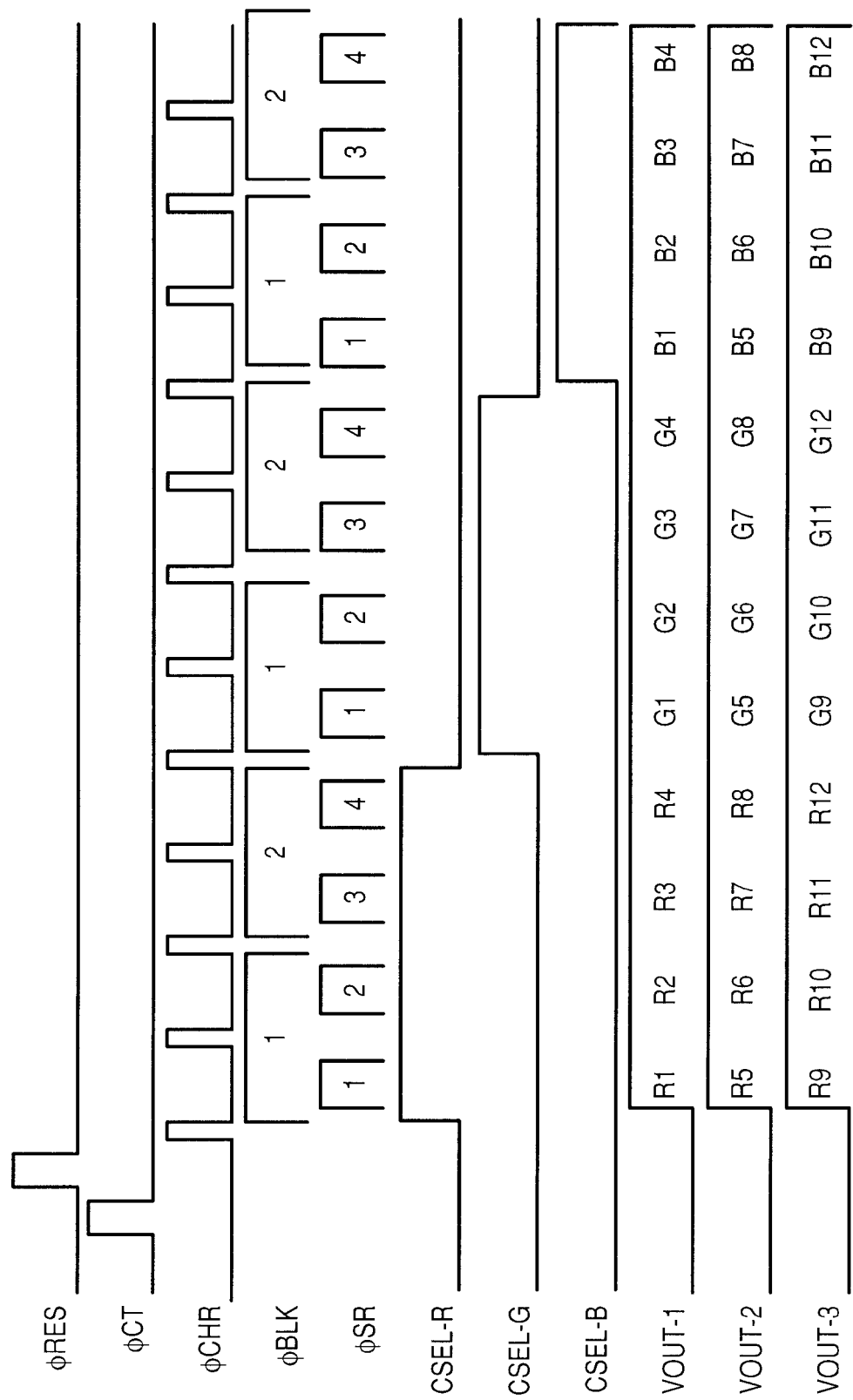
FIG. 16 is a timing chart of the second embodiment.

Next, the operation of the present embodiment will be described by referring to the timing chart of FIG. 16. Note that the same reference numerals or characters are assigned to the same components as those in FIG. 14 described above, and the description thereof is omitted. Since a unit cell group 1013 consists of four bits, the color selecting signal 1012 (CSEL-R, G, and B) has a 4-pixel period. Since a block region 1001 consists of two bits, the block selecting signal 1005 (φBLK) has a 2-pixel period. The operation thereof is a combination of the aforementioned operation and thus the detail description is omitted.

The total capacitance value CH of the common output lines 8 according to the present embodiment will be discussed. Two solid-state imaging apparatuses each having an N number of bits, three colors, and an M number of blocks are compared: one for the second reference example and one for the present embodiment.

(Second reference example) the number of switches: (N/M transfer switches)+(M number of block selecting switches).

(Second embodiment) the number of switches: (N/M transfer switches)+(M/3 block selecting switches)+(three color selecting switches).

(Difference 2)M−M/3−3=2M/3−3.

As described in the second reference example, the optimal number of blocks is determined depending on the number of pixels, the wiring conditions and like, but it is understood that the present embodiment further reduce the total capacitance value CH of the common output lines 8 by the difference 2 as described above. Further, like the first embodiment, the present embodiment can reduce the number of transfer switches 53 connected per scanning signal 7.

Moreover, in comparison with the configuration of the second reference example, the present embodiment can reduce the number of block output lines 1002 and thus can provide a small footprint solid-state imaging apparatus.

As described above, the second embodiment of the present invention provides the solid-state imaging apparatus which outputs for each plurality of color components. According to the present embodiment, the color selecting switches 1010 in one or a plurality of columns are connected to a transfer switch 53, in each unit cell group 1013, the transfer switches 53 in a plurality of columns are connected to a block selecting switch 1003, then, each block selecting switch 1003 is connected to a different common output line 8 for each divided unit cell group 1013, a scanning circuit 6 is provided for each unit cell group 1013, and each scanning circuit 6 is scanned the same number of times as the number of colors. Thus, the solid-state imaging apparatus according to the present embodiment can reduce the common output line capacitance more than the conventional solid-state imaging apparatus. In addition, the solid-state imaging apparatus according to the present embodiment can reduce the load of the scanning circuits, and thus more effective for high-speed operation than the conventional solid-state imaging apparatus. Further, the solid-state imaging apparatus according to the present embodiment can reduce the number of block output lines 1002 and thus can provide a smaller footprint solid-state imaging apparatus than the conventional solid-state imaging apparatus.

(Third Embodiment)

Figure 17:
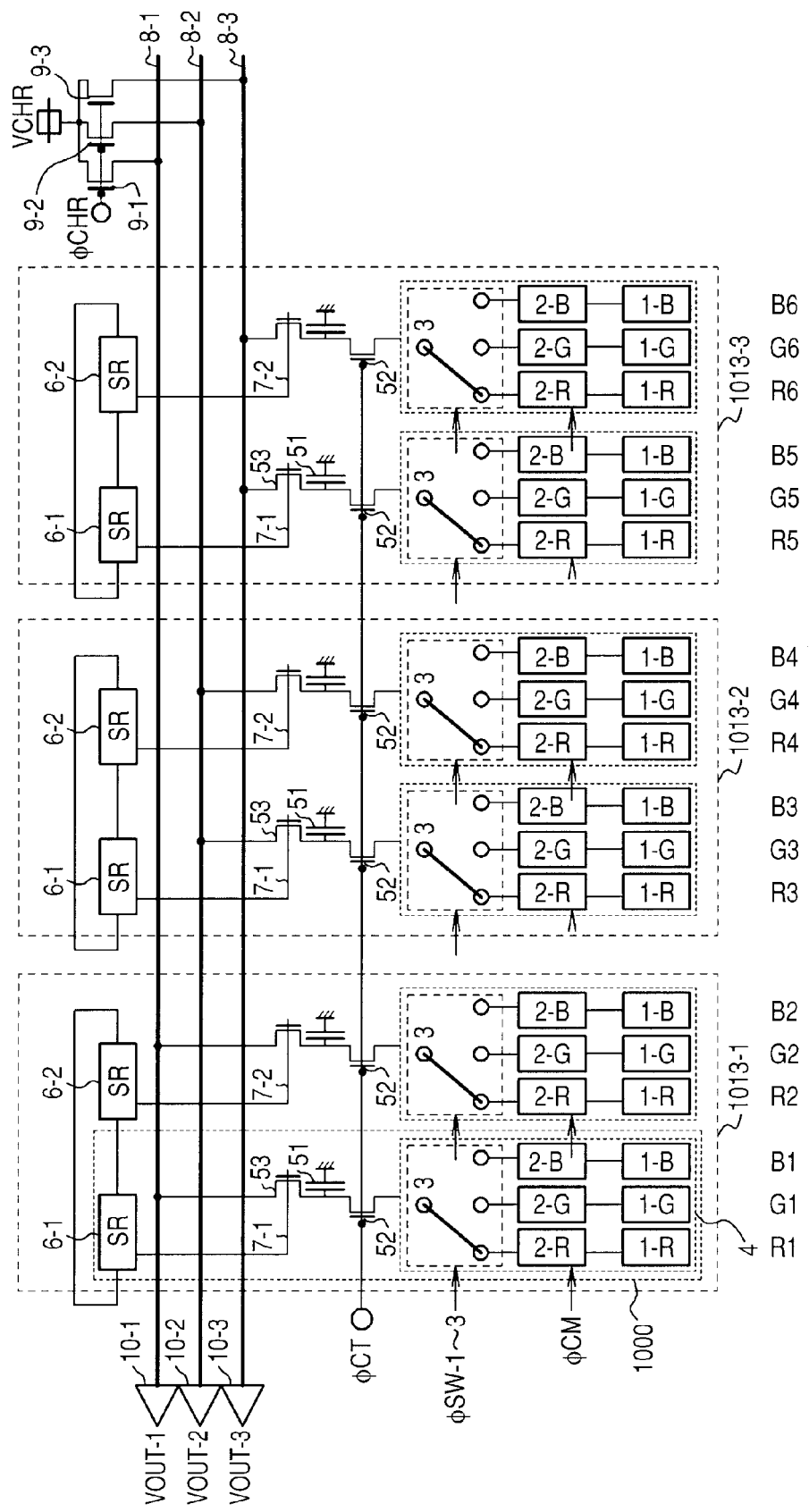
FIG. 17 illustrates a configuration example of a solid-state imaging apparatus of a third embodiment.

FIG. 17 illustrates a configuration example of a solid-state imaging apparatus of a third embodiment of the present invention. Note that the same reference numerals or characters are assigned to the same components as those in FIGS. 1 and 13 described above, and the description thereof is omitted. According to the configuration (FIG. 1) of the third reference example, the switching units 12 are inserted between the transfer switches 53 in the holding units 5 and the common output lines 8, but according to the present embodiment, the transfer switches are directly connected to the common output lines 8. The connection between the transfer switches 53 and the common output lines 8 is the same as that of the first embodiment. That is, the transfer switch 53 of the first unit cell group 1013-1 is connected to the common output line 8-1. The transfer switch 53 of the second unit cell group 1013-2 is connected to the common output line 8-2. The transfer switch 53 of the third unit cell group 1013-3 is connected to the common output line 8-3.

Figure 18:
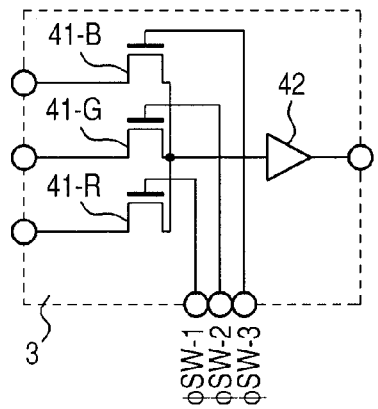
FIG. 18 illustrates a configuration example of the selection unit.

The selection unit 3 can be configured as illustrated in FIG. 18. Here, the selection transistor 41-R connected to φSW-1 selects the signal from the R pixel 1-R. Likewise, the selection transistor 41-G connected to φSW-2 selects the signal from the G pixel 1-G, and the selection transistor 41-B connected to φSW-3 selects the signal from the B pixel 1-B. If all unit cell groups 1013 have the same connection relation with the selection unit 3, the color component of the signal output from the selection unit 3 is the same to all the pixels with respect to the φSW control. In order to output a different color for each unit cell group 1013, a different connection may be provided for each unit cell group 1013 as illustrated in FIG. 4.

By referring to the timing chart of FIG. 19, the operation of the present embodiment will be described. Note that the same reference numerals or characters are assigned to the same components as those in FIGS. 8 and 14 described above, and the description thereof is omitted. The signals of all the pixels are collectively held in the intermediate holding units 2, and when φSW-1 and φCT go high, the R pixels 1-R in all unit cell groups 1013 are held in the holding capacitors 51. Then, the signals are output from each common output line 8 in response to the scanning signal 7 (φSR). The subsequent operation is the same as described above and the description is omitted.

The total capacitance value CH of the common output lines 8 according to the present embodiment is the same as that in the first embodiment, and in comparison with the third reference example, the difference is 1, which means reduction in the common output line capacitance. Moreover, in comparison with the third reference example, the switching unit 12 is not required, and in comparison with first embodiment, the color selecting unit 1011 or the color selecting signal 1012 is not required. Thus, the present embodiment can reduce the number of components and thus can provide a small footprint solid-state imaging apparatus.

The third embodiment of the present invention is the solid-state imaging apparatus including pixels 1 having a plurality of colors per column and sharing a holding unit 51 for reading. According to the present embodiment, the transfer switch 53 is connected to a different common output line 8 for each divided unit cell group 1013, a scanning circuit 6 is provided for each unit cell group 1013, and each scanning circuit 6 is scanned the same number of times as the number of colors. Thus, the solid-state imaging apparatus according to the present embodiment can reduce the common output line capacitance more than the conventional solid-state imaging apparatus. Further, the solid-state imaging apparatus according to the present embodiment can reduce the number of components and thus can provide a small footprint solid-state imaging apparatus.

(Fourth Embodiment)

Figure 19:
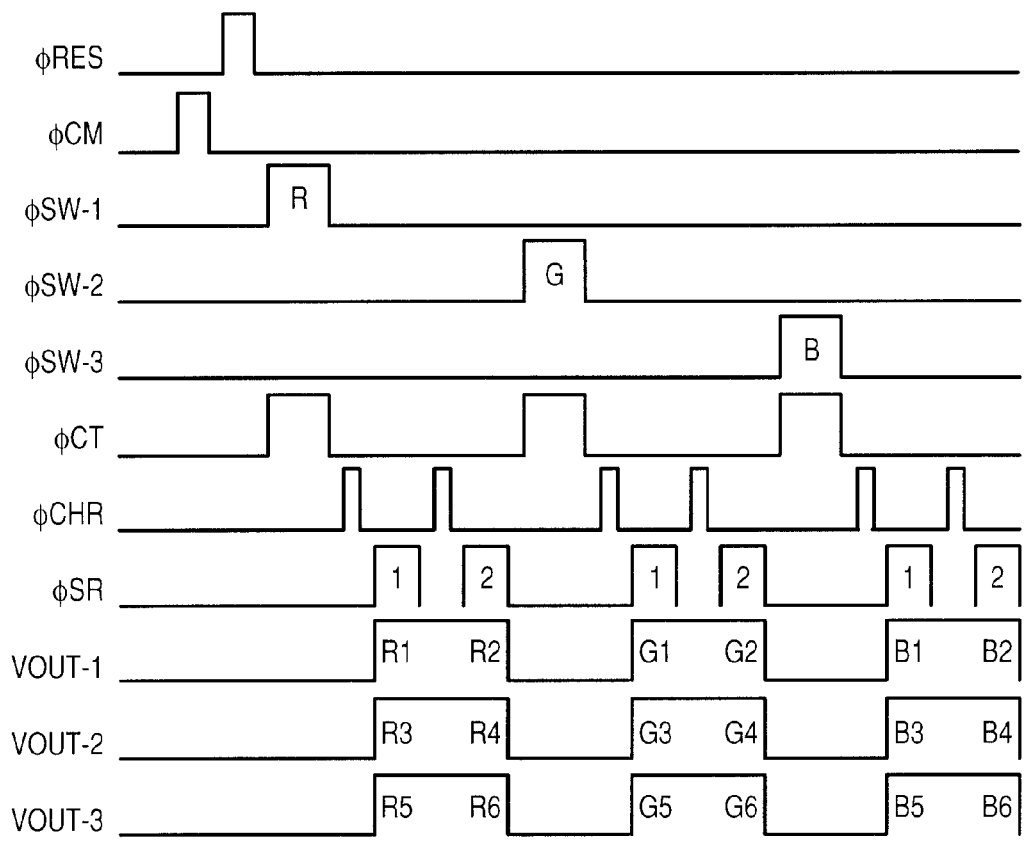
FIG. 19 is a timing chart of the third embodiment.
Figure 20:
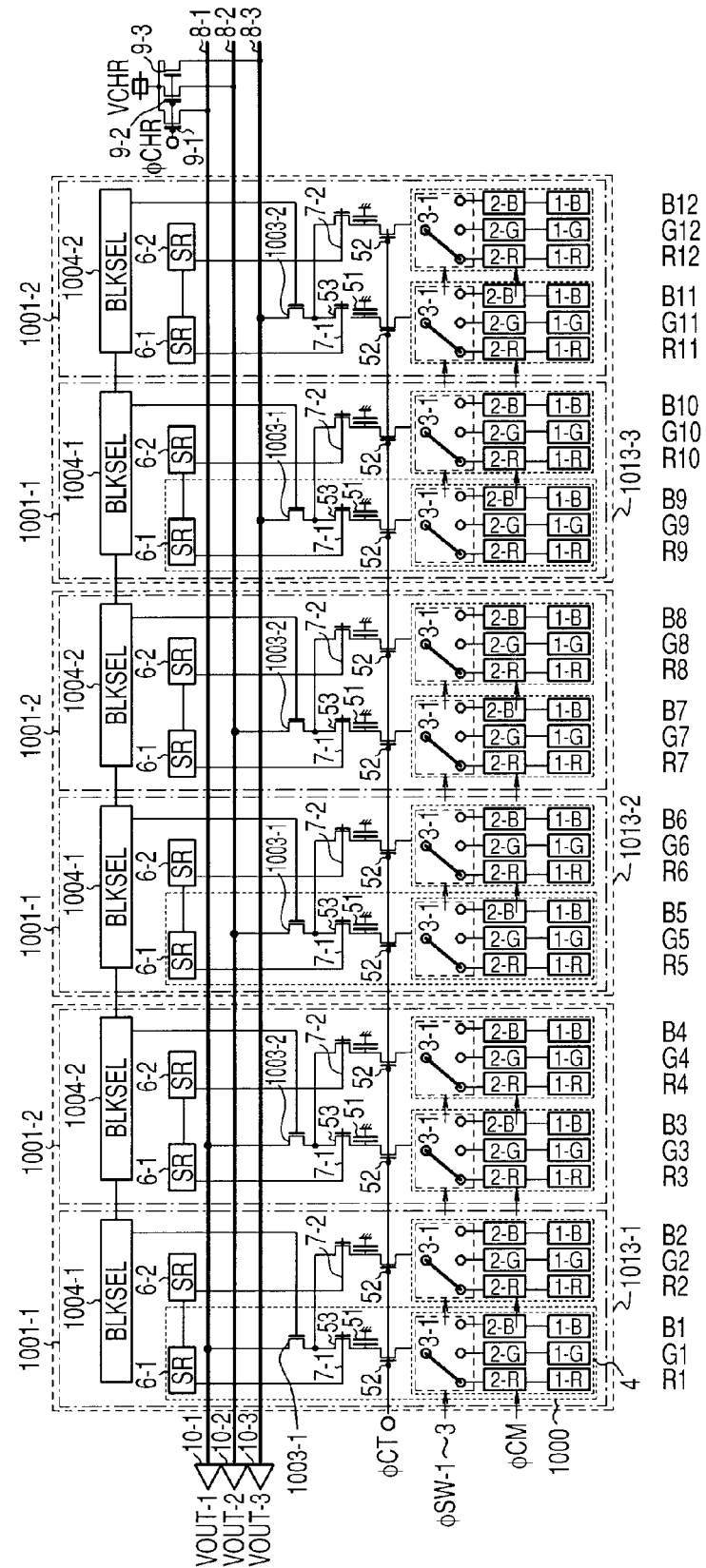
FIG. 20 illustrates a configuration example of a solid-state imaging apparatus of a fourth embodiment.

FIG. 20 illustrates a configuration example of a solid-state imaging apparatus of a fourth embodiment of the present invention. Note that the same reference numerals or characters are assigned to the same components as those in FIGS. 11 and 18 described above, and the description thereof is omitted. According to the present embodiment, the blocking technique disclosed in the second reference example is applied to the configuration of the third embodiment to provide a 12 bit×3 color solid-state imaging apparatus to be described below. The operation thereof is a combination of that described in FIGS. 12 and 19, and thus the description is omitted.

First, the total capacitance value CH of the common output lines 8 according to the present embodiment will be discussed. Two solid-state imaging apparatuses each having an N number of bits, three colors, and an M number of blocks are compared: one for the third reference example using the blocking technique and one for the present embodiment. Here, as described in the third reference example, the total capacitance value at this time is the same as that in the second reference example. The solid-state imaging apparatus according to the present embodiment includes transfer switches 53 and block selecting switches 1003.

(Second reference example) the number of switches: (N/M number of transfer switches)+(M number of block selecting switches)

(Fourth embodiment) the number of switches: (N/M number of transfer switches)+(M/3 number of block selecting switches)

(Difference 4) 2M/3

As described in the second reference example, the optimal number of blocks is determined depending on the number of pixels, the wiring conditions and like, but it is understood that the present embodiment further reduce the total capacitance value CH of the common output lines 8 by the difference 4 as described above.

In comparison with the third reference example, the switching unit 12 is not required, in comparison with second embodiment, the color selecting unit 1011 or the color selecting signal 1012 is not required, and further, in comparison with the second embodiment, the number of block selecting switches 1003 can be reduced. Thus, the present embodiment can reduce the number of components and thus can provide a small footprint solid-state imaging apparatus.

As described above, the fourth embodiment of the present invention is the solid-state imaging apparatus including pixels 1 having a plurality of colors per column and sharing a holding unit 51 for reading. According to the present embodiment, in each unit cell group 1013, the transfer switches 53 in a plurality of columns are connected to a block selecting switch 1003, each block selecting switch 1003 is connected to a different common output line 8 for each divided unit cell group 1013, a scanning circuit 6 is provided for each unit cell group 1013, and each scanning circuit 6 is scanned the same number of times as the number of colors. Thus, the solid-state imaging apparatus according to the present embodiment can reduce the common output line capacitance more than the conventional solid-state imaging apparatus. Further, the solid-state imaging apparatus according to the present embodiment can reduce the number of components and thus can provide a small footprint solid-state imaging apparatus.

(Fifth Embodiment)

The solid-state imaging apparatus according to a fifth embodiment of the present invention will be described. According to the present embodiment, a switched-capacitor amplifier disclosed in Patent Document 4 is used as the amplifier unit 42 in the selection unit 3 illustrated in FIG. 18 in configurations of the third and fourth embodiments. In addition, the present embodiment includes a gain switching unit which switches the capacitance ratio, which has the same effect as switching a gain of the amplifier unit 42.

Now, the operation of the present embodiment will be described, assuming that the solid-state imaging apparatus includes a gain switching unit and a gain switching signal GSEL for controlling the gain switching unit, which are added to the configuration illustrated in FIG. 17. The operation of the present embodiment will be described by referring to the timing chart of FIG. 21. Note that the same reference numerals or characters are assigned to the same components as those in FIG. 18 described above, and the description thereof is omitted. The gain switching unit is controlled so that the amplifier unit 42 enters a first gain (Gain-R) when φSW-1 and φCT go high. Likewise, the gain switching unit is controlled so that the amplifier unit 42 enters a second gain (Gain-G) when φSW-2 and φCT go high, and the amplifier unit 42 enters a third gain (Gain-B) when φSW-3 and φCT go high. By switching the gain in this manner, the signals with a gain specific to each color component can be read from the amplifier unit 42. In order to simultaneously read a different color for each divided unit cell group 1013, control may be performed so as to set a gain corresponding to the color component to be read for each unit cell group 1013. Note that the switching timing of the gain switching signal GSEL is not limited to the above illustrated in the figure, but any timing will do as long as an appropriate gain is selected when each φSW and φCT go high.

It is desirable to set the first to third gains so as to ensure optimum white balance determined by a combination of the optical system such as the image reader apparatus to which the solid-state imaging apparatus is applied and the spectral properties of the solid-state imaging apparatus itself. Note that if the gain of the G pixel 1-G and the B pixel 1-B can be shared, two gains may be set. In general, the image reader apparatus such as a copying machine includes an amplifier circuit and an A/D converter circuit at a following stage of the solid-state imaging apparatus and the amplifier circuit is used to set a gain specific to each color so as to optimize white balance. Such an amplifier circuit is generally available in a dedicated IC chip or the dedicated IC chip may often contain the A/D converter circuit. Therefore, the setting of the gain specific to each color can be incorporated into the solid-state imaging apparatus to simplify the entire system configuration of the image reader apparatus, thereby contributing to low costs.

According to the configuration of the present embodiment, the setting of the gain specific to each color can be set by an output circuit, but, when the S/N ratio as the solid-state imaging apparatus is considered, it is desirable to set in a preceding state thereof as much as possible. Thus, it is most suitable in the present configuration that the amplifier unit 42 performs the setting of the gain specific to each color.

As described above, the fifth embodiment of the present invention adds the gain switching unit to the amplifier unit 42 and sets a gain specific to each color to be read. This configuration allows the amplifier circuit in the following stage to be removed, thereby simplifying the entire system configuration of the image reader apparatus and contributing to low costs.

As described above, the solid-state imaging apparatus according to the first and second embodiments includes a plurality of unit cell groups 1013 arranged in the row direction, and a plurality (an integral multiple of m) of common output lines 8 for transmitting output signals from a plurality of unit cell groups 1013. Note that m is an integer of 1 or more. Each of the plurality of unit cell groups 1013 includes a plurality of unit cells 1000 arranged in the row direction. Each of the plurality of unit cells 1000 includes an m number of pixels 1, an m number of holding units (capacitors) 51, an m number of color selecting switches 1010, and one transfer switch 53. The m number of pixels 1 each includes a photoelectric conversion element 21 converting incident light to different color signals and is arranged in a column direction. The m number of holding units (capacitors) 51 holds color signals of the m number of pixels 1. The m number of color selecting switches 1010 selects one of the color signals held in the m number of holding units 51. The one transfer switch 53 outputs the color signal selected by the color selecting switch 1010 to a common output line 8 of the plurality (an integral multiple of m) of the common output lines 8. The transfer switch 53 is connected to a different common output line 8 for each unit cell group 1013. The signals are read in parallel through the plurality (an integral multiple of m) of common output lines 8.

The one transfer switch 53 is connected to the m number of holding units 51 through the m number of color selecting switches 1010. The color signals with the same color are read in parallel through the common output lines 8 as illustrated in FIGS. 14 and 16.

According to the second embodiment, each of the plurality of unit cell groups 1013 is divided into a plurality of block regions 1001. Each of the plurality of block regions 1001 includes a plurality of unit cells 1000. Each of the plurality of block regions 1001 includes one block selecting switch 1003 provided between a plurality of transfer switches 53 in the plurality of unit cells 1000 therein and one common output line 8 of the plurality (an integral multiple of m) of common output lines 8. The block selecting switch 1003 is connected to a different common output line 8 for each unit cell group 1013.

The solid-state imaging apparatus according to the third to fifth embodiments includes a plurality of unit cell groups 1013 arranged in the row direction, and a plurality (an integral multiple of m) of common output lines 8 for transmitting output signals from the plurality of unit cell groups 1013. Each of the plurality of unit cell groups 1013 includes a plurality of unit cells 1000 arranged in the row direction. Each of the plurality of unit cells 1000 includes an m number of pixels 1 each including a photoelectric conversion element 21 converting incident light to different color signals and arranged in a column direction, a holding unit 51 holding a color signal, and a transfer switch 53 transmitting the color signal held in the holding unit 51 to the common output line 8. The transfer switch 53 is connected to a different common output line 8 for each unit cell group 1013. The signals are read in parallel through the plurality (an integral multiple of m) of common output lines 8.

Each of the plurality of unit cells 1000 includes a selection unit 3 which selects one of the color signals of the m number of pixels so as to be held in a holding unit 51.

The selection unit 3 includes an amplifier unit amplifying the color signal. According to the fifth embodiment, the amplifier unit 42 changes the gain in response to the input color signal.

As illustrated in FIGS. 19 and 21, the transfer switch 53 in the unit cell group 1013 sequentially outputs a plurality of color signals for each color to a common output line 8 of the plurality (an integral multiple of m) of the common output lines 8.

According to the fourth embodiment, each of the plurality of unit cell groups 1013 is divided into a plurality of block regions 1001. Each of the plurality of block regions 1001 includes a plurality of unit cells 1000. Each of the plurality of block regions 1001 includes one block selecting switch 1003 provided between a plurality of transfer switches 53 in the plurality of unit cells 1000 therein and one common output line 8 of the plurality (an integral multiple of m) of common output lines 8. The block selecting switch 1003 is connected to a different common output line 8 for each unit cell group 1013.

The color signals with the same color are read in parallel through the common output lines 8 as illustrated in FIGS. 19 and 21.

The first to fifth embodiments can reduce the common output line capacitance as well as can be reduce the load of the scanning circuit controlling the transfer switch. Thus, the first to fifth embodiments enable high-speed operation, can reduce the number of components, and thus can provide a small footprint solid-state imaging apparatus.

It should be noted that each of the above embodiments illustrates just a specific example of implementing the present invention and should not be construed to limit the technical scope of the present invention. That is, the present invention can be implemented in various forms without departing from the technical ideas or major characteristics thereof. For example, according to the present invention, signals can be read in parallel through a plurality of common output lines, but an effect can be obtained without reading in parallel through all the common output lines.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-039401, filed on Feb. 23, 2009, which is hereby incorporated by reference herein in its entirety.

What is claimed is:

1. A solid-state imaging apparatus comprising:
    a plurality of unit cell groups, each of the unit cell groups including a plurality unit cells; and
    common output lines,
    wherein each of the unit cells includes:
        a plurality of pixels each including a photoelectric conversion element corresponding to one of different colors;
        a plurality of holding units each corresponding to one of the different colors, for holding a signal from the pixels;
        a selecting switch arranged at a stage following the holding units, for selecting the signal held by the holding unit; and
        a transfer switch arranged at a stage following the selecting switch, for outputting the signal selected by the selecting switch to one of the common output lines, and
    wherein the plurality of unit cell groups include:
        a first unit cell group including a plurality of the transfer switches, each of the transfer switches including an output node connected to a first common output lines among the common output lines, and
        a second unit cell group including a plurality of the transfer switches, each of the transfer switches including an output node connected to a second common output line among the common output lines, but not to the first common output line, and
    wherein all of the signals from each one of the plurality of unit cell groups are read out in parallel through a corresponding one of the transfer switches to a corresponding common output line.

2. The solid-state imaging apparatus according to claim 1, wherein the holding unit includes m holding elements each corresponding to one of m pixels.

3. The solid-state imaging apparatus according to claim 2, wherein each of the transfer switch is connected through the selecting switches to the holding elements.

4. The solid-state imaging apparatus according to claim 1, wherein
    the each of the plurality of unit cell groups is classified into a plurality of block regions,
    each of the plurality of block regions includes a plurality of the unit cells,
    each of the plurality of block regions includes a block selecting switch arranged between one common output lines and a plurality of the transfer switches within the plurality of the unit cells in the each of the plurality of block regions, and
    the block selecting switch in one of the unit cell groups is connected to the one common output line corresponding to the one of the unit cell groups.

5. The solid-state imaging apparatus according to claim 1, wherein the signals for the same color are read out from the same one of the common output lines.

6. The solid-state imaging apparatus according to claim 1, wherein the holding units is arranged correspondingly to one of the unit cells.

7. The solid-state imaging apparatus according to claim 6, further comprising an interposing capacitor interposed between one of the holding units and a corresponding one of the photoelectric conversion elements. correspondingly the same photoelectric conversion element.

8. The solid-state imaging apparatus according to claim 5, wherein each of the selecting switches includes an amplifier element for amplifying a color signal.

9. The solid-state imaging apparatus according to claim 8, wherein a gain of the amplifier element is variable.

* * * * *